United States Patent
Shen et al.

(10) Patent No.: US 12,021,461 B1
(45) Date of Patent: Jun. 25, 2024

(54) HIGH-SPEED MOTOR SYSTEM WITH AIR BEARING SUPPORTING AND CONTROL METHOD THEREOF

(71) Applicant: Zhejiang University, Hangzhou (CN)

(72) Inventors: Jianxin Shen, Hangzhou (CN); Dan Shi, Hangzhou (CN); Kai Luo, Hangzhou (CN); Jinhui Ye, Hangzhou (CN); Jinhui Gao, Hangzhou (CN); Yunchong Wang, Hangzhou (CN); Xiaoyan Huang, Hangzhou (CN)

(73) Assignee: Zhejiang University, Hangzhou (CN)

( * ) Notice: Subject to any disclaimer, the term of this patent is extended or adjusted under 35 U.S.C. 154(b) by 0 days.

(21) Appl. No.: 18/404,293

(22) Filed: Jan. 4, 2024

(30) Foreign Application Priority Data

Apr. 18, 2023 (CN) .......................... 202310414962.0

(51) Int. Cl.
*H02P 21/00* (2016.01)
*F16C 32/06* (2006.01)
(Continued)

(52) U.S. Cl.
CPC .......... *H02P 21/05* (2013.01); *F16C 32/0603* (2013.01); *H02K 7/083* (2013.01);
(Continued)

(58) Field of Classification Search
CPC .......... H02P 21/05; H02P 21/18; H02P 21/22; H02K 11/21; H02K 11/33; H02K 7/082; H02K 21/14; F16C 32/0603
(Continued)

(56) References Cited

U.S. PATENT DOCUMENTS

| | | | | |
|---|---|---|---|---|
| 4,761,876 A | * | 8/1988 | Kosmowski | ....... B23Q 3/15706 483/65 |
| 6,353,273 B1 | * | 3/2002 | Heshmat | ............. F16C 32/0444 384/103 |

(Continued)

FOREIGN PATENT DOCUMENTS

CN 116155012 B 7/2023

OTHER PUBLICATIONS

First Office Action, App. No. CN202310414962.0, Issued May 31, 2023, 4 pages.
(Continued)

*Primary Examiner* — Erick D Glass
(74) *Attorney, Agent, or Firm* — Berkeley Law & Technology Group, LLP

(57) ABSTRACT

Disclosed are a high-speed motor system with air bearing support and a control method thereof. The system includes: a rotating shaft, air bearings, a motor stator, a motor rotor, and radial displacement sensors. The radial displacement sensors are arranged in two groups, located outside the rotating shaft at both sides of the motor rotor; the radial displacement sensors are used to detect displacement of the rotating shaft in x-axis and y-axis directions. The motor stator is provided with stator slots having armature windings inside. The armature windings are electrically connected to a controller. The armature windings are averagely divided into p winding units according to the number of pole pairs p thereof. The controller includes p controller units that control the winding units respectively. The controller unit inputs a damping current component to the corresponding winding unit, for generating an electromagnetic damping force.

10 Claims, 6 Drawing Sheets

(51) Int. Cl.
  *H02K 7/08* (2006.01)
  *H02K 11/21* (2016.01)
  *H02K 11/33* (2016.01)
  *H02K 21/14* (2006.01)
  *H02P 21/05* (2006.01)
  *H02P 21/18* (2016.01)
  *H02P 21/22* (2016.01)

(52) U.S. Cl.
  CPC ............ *H02K 11/21* (2016.01); *H02K 11/33* (2016.01); *H02K 21/14* (2013.01); *H02P 21/18* (2016.02); *H02P 21/22* (2016.02); *F16C 2380/26* (2013.01); *H02P 2207/055* (2013.01)

(58) Field of Classification Search
  USPC .................................................... 318/400.02
  See application file for complete search history.

(56) References Cited

U.S. PATENT DOCUMENTS

| | | | |
|---|---|---|---|
| 6,965,181 B1* | 11/2005 | Heshmat | F16C 17/024 |
| | | | 310/90.5 |
| 2017/0047821 A1* | 2/2017 | Klassen | H02K 1/2783 |

OTHER PUBLICATIONS

Notification to Grant a Patent Right for Invention, App. No. CN202310414962.0, Issued Jun. 21, 2023, 2 pages.

* cited by examiner

HIGH-SPEED MOTOR SYSTEM WITH AIR BEARING SUPPORTING AND CONTROL METHOD THEREOF

CROSS REFERENCE TO RELATED APPLICATION

This patent application claims the benefit and priority of Chinese Patent Application No. 2023104149620, filed with the China National Intellectual Property Administration on Apr. 18, 2023, the disclosure of which is incorporated by reference herein in its entirety as part of the present application.

TECHNICAL FIELD

The present disclosure relates to the technical field of motors, and in particular, to a high-speed motor system with air bearing supporting and a control method thereof.

BACKGROUND

High-speed motor technology is developing rapidly, and one of the bottlenecks limiting the development of high-speed electric drive systems is high-speed bearings. Increasing the power and speed of motors can intensify the friction in contact bearings. Therefore, high-power high-speed motors often use air bearings as non-contact support structures to meet the requirements of high-speed, high precision, high efficiency, high/low-temperature resistance, cleanliness, and long lifespan of the motors.

Dynamic pressure air bearings (referred to as air bearings in the specification) use the fluid dynamic pressure of the air in the gap between the rotating journal and the stationary bearing bore to provide load-bearing capacity for the rotor. Air bearings have a simple and compact structure, high reliability, low manufacturing difficulty, and low cost, and are widely used in small to medium-sized wind turbines at present. However, air bearings cannot actively control bearing damping, which makes them unstable during high-speed operation. To address the issue of instability of air bearings during high-speed operation, the industry has attempted to use elastic support structures to provide external damping for air bearings. However, the added external structure is relatively complex, involving various manufacturing processes, resulting in higher manufacturing costs.

Improving the operational performance of air bearings through structure design and optimization also has limitations. The industry has also proposed using electromagnetic means to enhance the dynamic characteristics of air bearings. For example, solutions such as magnetic-gas composite bearings, slotless motors with built-in electromagnetic dampers, and bearingless motors have been suggested. However, each of these solutions has its drawbacks: The magnetic gas composite bearings have more complex design, manufacturing, and maintenance requirements and occupy larger radial or axial space. The solution of the slotless motors with built-in electromagnetic dampers may not be applicable to motors with slots and is only suitable for low-power high-speed motors, limiting its range of application. The bearingless motors involve complex and challenging decoupling control, and the motors need to simultaneously generate torque and significant levitation force. Limited by system capacity, power of the bearlingless motors is restricted.

Therefore, it is essential to design a high-power high-speed motor with air bearing support that can operate stably.

SUMMARY

Accordingly, an objective of the present disclosure is to provide a high-speed motor system with air bearing support and a control method thereof. The high-speed motor system with air bearing support and the control method thereof according to the present disclosure actively provide electromagnetic damping, that is, external damping needed for stable operation of air bearings is provided in high-speed operating conditions.

According to a first aspect, the present disclosure provides a high-speed motor system with air bearing support, including: a rotating shaft, air bearings, a motor stator, a motor rotor, and radial displacement sensors.

The radial displacement sensors are arranged in two groups, located outside the rotating shaft at both sides of the motor rotor; the radial displacement sensors are used to detect displacement of the rotating shaft in x-axis and y-axis directions.

The motor stator is provided with stator slots having armature windings inside. The armature windings are electrically connected to a controller. The armature windings are averagely divided into p winding units according to the number of pole pairs p thereof. The controller includes p controller units that control the winding units respectively. The controller unit inputs a damping current component to the corresponding winding unit, for generating an electromagnetic damping force.

Preferably, each group of the radial displacement sensors include two displacement sensors arranged at a 90° angle to each other, for measuring the displacement of the rotating shaft in the x-axis and y-axis directions.

Preferably, a motor rotor position sensor is further provided outside the rotating shaft, to measure a position angle of the motor rotor.

According to a second aspect, the present disclosure provides a control method of a high-speed motor with air bearing support, for controlling the foregoing high-speed motor rotor system with air bearing support. The method includes the following steps:

S1: detecting and calculating real-time motion velocities $v_x$ and $v_y$ of a rotating shaft of a motor in x-axis and y-axis directions by using radial displacement sensors;

S2: detecting a position angle of a motor rotor by using a motor rotor position sensor and calculating a real-time rotational speed $\omega$ of the rotating shaft of the motor;

S3: calculating electromagnetic damping forces $F_x^*$ and $F_y^*$ required to maintain system stability under current operating conditions according to the real-time motion velocities $v_x$ and $v_y$, and the real-time rotational speed $\omega$ of the rotating shaft of the motor;

S4: calculating required electromagnetic damping force component amplitudes $F_1^*, F_2^*, \ldots, F_p^*$ for each winding unit according to the electromagnetic damping forces $F_x^*$ and $F_y^*$ required to maintain system stability under the current operating conditions; and S5: calculating damping current components $i_{d1}^*, i_{d2}^*, \ldots, i_{dn}^*, \ldots, i_{dp}^*$ needed for each winding unit according to the required electromagnetic damping force component amplitudes $F_1^*, F_2^*, \ldots, F_p^*$ for each winding unit.

Preferably, a method for calculating and measuring the real-time motion velocities $v_x$ and $v_y$ of the rotating shaft of the motor in the x-axis and y-axis directions in step S1 includes: measuring two sets of motion velocities $v_{x1}$, $v_{y1}$, and $v_{x2}$, $v_{y2}$ in the x-axis and y-axis directions at both sides of the rotating shaft of the motor by using two groups of displacement sensors that are located at both sides of the motor rotor, and calculating average values of the two sets of motion velocities as the motion velocities $v_x$ and $v_y$ of the rotating shaft of the motor in the x-axis and y-axis directions:

$$v_x = \frac{v_{x1} + v_{x2}}{2}, v_y = \frac{v_{y1} + v_{y2}}{2}.$$

Preferably, a method for calculating the electromagnetic damping forces $F_x^*$ and $F_y^*$ required to maintain system stability under the current operating conditions in step S3 includes:

S31: experimentally measuring dynamic damping coefficients $[C_{xx}, C_{xy}, C_{yx}, C_{yy}]$ and dynamic stiffness coefficients $[K_{xx}, K_{xy}, K_{yx}, K_{yy}]$ of air bearings corresponding to any rotational speed;

S32: based on stability conditions of the air bearings, for a rotor system with mass $m_r$:

$$\begin{vmatrix} m_r\gamma^2 + C_{xx}\gamma + K_{xx} & C_{xy}\gamma + K_{xy} \\ C_{yx}\gamma + K_{yx} & m_r\gamma^2 + C_{yy}\gamma + K_{yy} \end{vmatrix} = 0$$

by expanding the above equation, obtaining a characteristic equation about a vibration frequency $\gamma$, with real parts of roots less than 0, which indicates that required dynamic damping coefficients for vibration suppression are $[C_{xx}^s, C_{xy}^s, C_{yx}^s, C_{yy}^s]$ in the case of constant dynamic stiffness coefficients; and accordingly, calculating the damping coefficients required to maintain system stability as follows:

$$[C_{xx}^*, C_{xy}^*, C_{yx}^*, C_{yy}^*] = [C_{xx}^s - C_{xx}, C_{xy}^s - C_{xy}, C_{yx}^s - C_{yx}, C_{yy}^s - C_{yy}];$$

and

S33: calculating the electromagnetic damping forces $F_x^*$ and $F_y^*$ required to maintain system stability under the current operating conditions as follows:

$$F_x^* = C_{xx}^* \cdot v_x + C_{xy}^* \cdot v_y$$

$$F_y^* = C_{yx}^* \cdot v_x + C_{yy}^* \cdot v_y.$$

Preferably, a method for calculating the required electromagnetic damping force component amplitudes $F_1^*$, $F_2^*$, ..., $F_p^*$ for each winding unit in step S4 includes: determining a spatial phase angle $\varphi$ corresponding to each winding unit according to a position angle $\theta$ of the motor rotor in a current state, and calculating the required electromagnetic damping force component amplitudes $F_1^*$, $F_2^*$, ..., $F_p^*$ for each winding unit according to the spatial phase angle $\varphi$ of each winding unit and the electromagnetic damping forces $F_x^*$ and $F_y^*$.

Preferably, a method for calculating the damping current components needed for each winding unit in step S5 is as follows:

$$i_{dn}^* = F_n^*/K(\theta)$$

where $K(\theta)$ is a force-to-current coefficient determined experimentally.

Preferably, the method further includes:

S6: performing an inverse Park transformation on the damping current components $i_{d1}^*, i_{d2}^*, \ldots, i_{dn}^*, \ldots, i_{dp}^*$ of each winding unit to obtain currents $i_{\alpha1}^*/i_{\beta1}^*, i_{\alpha2}^*/i_{\beta2}^* \ldots, i_{\alpha p}^*/i_{\beta p}^*$ of each winding unit in a stationary two-phase coordinate system.

Preferably, the method further includes:

S7: converting the currents $i_{\alpha1}^*/i_{\beta1}^*, i_{\alpha2}^*/i_{\beta2}^* \ldots, i_{\alpha p}^*/i_{\beta p}^*$ of each winding unit in the stationary two-phase coordinate system to three-phase coordinate system currents $i_{a1}^*/i_{b1}^*/i_{c1}^*, i_{a2}^*/i_{b2}^*/i_{c2}^* \ldots, i_{ap}^*/i_{bp}^*/i_{cp}^*$ through an inverse Clarke transformation, and outputting, by controller units, the three-phase coordinate system currents $i_{a1}^*/i_{b1}^*/i_{c1}^*, i_{a2}^*/i_{b2}^*/i_{c2}^* \ldots, i_{ap}^*/i_{bp}^*/i_{cp}^*$ to respective drive circuits of the winding units.

Compared with the prior art, beneficial effects of the present disclosure are as follows:

(1) By providing additional damping forces to the rotating shaft based on the inherent dynamic characteristics of the air bearings, the present disclosure improves the high-speed stability of the air bearings, enhances the overall system reliability, and increases the maximum rotational speed of the system.

(2) Unlike bearingless motors that need to provide electromagnetic support forces for the entire rotating shaft throughout its operation, the present disclosure relies on air bearings, and the motor only needs to provide relatively small radial damping forces in addition to the torque, resulting in lower damping components of the current, making the motor applicable in high-power scenarios.

(3) Compared to magnetic-gas hybrid bearing systems, the technical solution of the present disclosure eliminates the magnetic bearing structure, saving space in the radial or axial direction, thereby achieving a smaller volume and higher power density.

(4) The present disclosure reuses the armature windings of the motor. The effective structure of the motor is used efficiently, and the hardware structure is simple. The present disclosure can be implemented by retrofitting a standard motor without modifying the stator structure, and there is no need to increase the capacity of the inverter, which keeps the cost low and achieves high universality.

(5) The provided electromagnetic damping forces are controllable in a segmented manner, allowing for independent control for the winding units. The control is decoupled, which minimizes mutual interference.

In the figures, 10: rotating shaft; 11: air bearing; 12: motor stator; 13: armature winding; 14: motor rotor; 20: radial displacement sensor; 30: motor rotor position sensor; 40: controller; 41: drive circuit.

DETAILED DESCRIPTION OF THE EMBODIMENTS

The present disclosure will be described below with reference to embodiments, but the present disclosure is not limited to these embodiments. In the following detailed description of the present disclosure, some specific details are described in detail. Those skilled in the art can fully understand the present disclosure without the description of these details. In in order to avoid confusion of the essence of the present disclosure, well-known methods, processes, procedures, elements and circuits are not described in detail.

In addition, it should be understood by those of ordinary skill in the art that the drawings provided herein are illustrative only but are unnecessarily drawn to scale.

Moreover, it should be understood that, in the following description, "circuit" means an electrically conductive loop consisting of at least one element or subcircuit connected electrically or electromagnetically. When an element or circuit is referred to as being "connected" to another element or an element/circuit is "connected" between two nodes, it can be directly coupled or connected to another element, or there may be an intermediate element. The connection between elements may be a physical connection, a logical connection, or a combination thereof. Conversely, when an element is referred to as being "directly coupled to" or "directly connected to" another element, it means that there is no intermediate element between the two.

Unless otherwise specified in the context, the words "include", "comprise" and similar words throughout the specification and claims should be construed as inclusive rather than exclusive or exhaustive; i.e., as "including, but not limited to".

In the description of the present disclosure, it should be understood that the terms "first" and "second" in the description of the present disclosure are only used for description purpose and cannot be understood to indicate or imply relative importance. Moreover, in the description of the present disclosure, unless otherwise specified, "a plurality of" means two or more.

Figure 1:
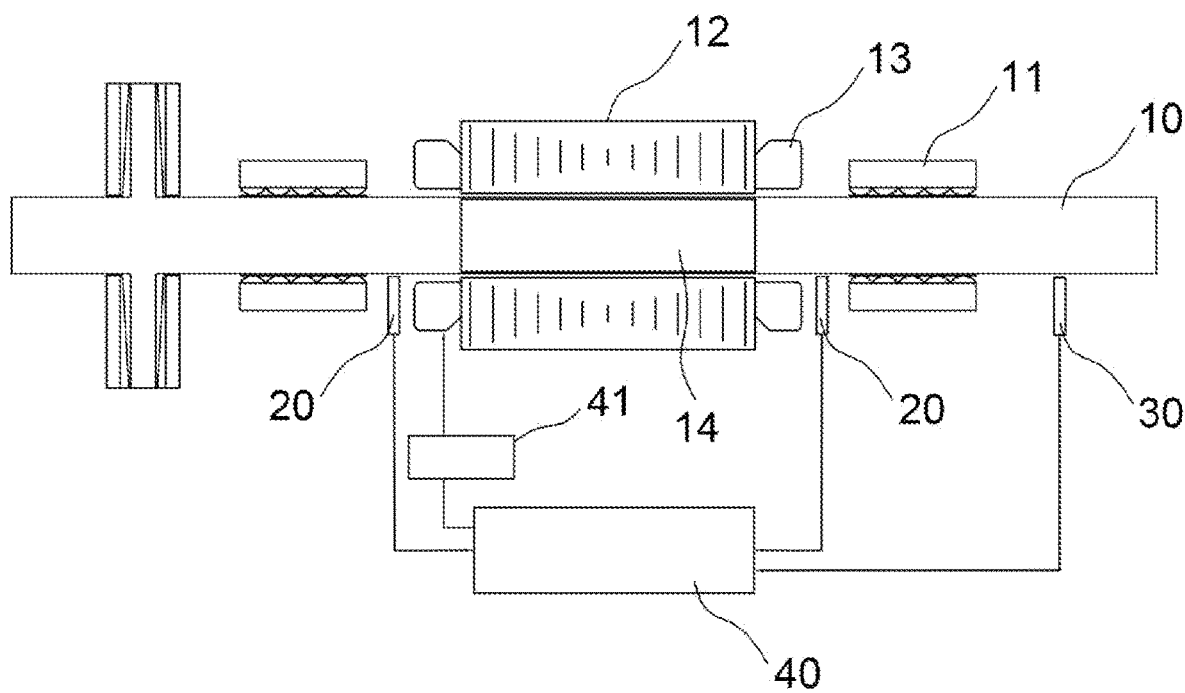
FIG. 1 is a schematic structural diagram of a motor system according to an embodiment of the present disclosure.
Figure 2:
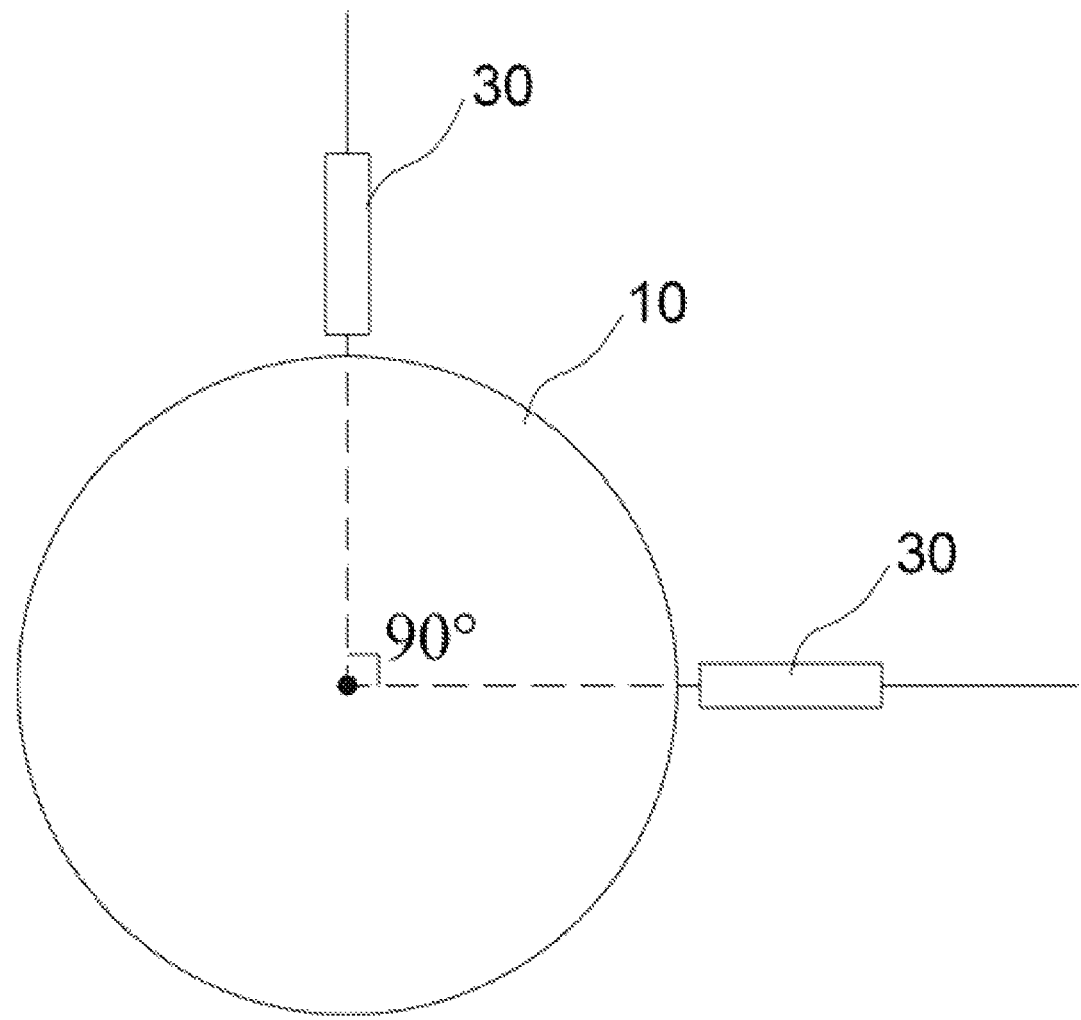
FIG. 2 is a schematic diagram showing installation positions of radial displacement sensors according to an embodiment of the present disclosure.

As shown in FIG. 1 and FIG. 2, a high-speed motor system with support of air bearings 11 includes a rotating shaft 10, air bearings 11, a motor stator 12, a motor rotor 14, and radial displacement sensors 20. The radial displacement sensors 20 are arranged in two groups, located outside the rotating shaft 10 at both sides of the motor rotor 14; the radial displacement sensors 20 are used to detect displacement of the rotating shaft 10 in x-axis and y-axis directions. Each group of the radial displacement sensors 20 include two displacement sensors arranged at a 90° angle to each other, for measuring the displacement of the rotating shaft 10 in the x-axis and y-axis directions. The motor stator 12 is provided with stator slots having armature windings 13 inside. The armature windings 13 are electrically connected to a controller 40. The armature windings 13 are averagely divided into p winding units according to the number of pole pairs p thereof. The controller 40 includes p controller units that control the winding units respectively. The controller unit inputs a damping current component to the corresponding winding unit, for generating an electromagnetic damping force. A position sensor 30 for the motor rotor 14 is further provided outside the rotating shaft 10, to measure a position angle of the motor rotor 14.

Figure 3:
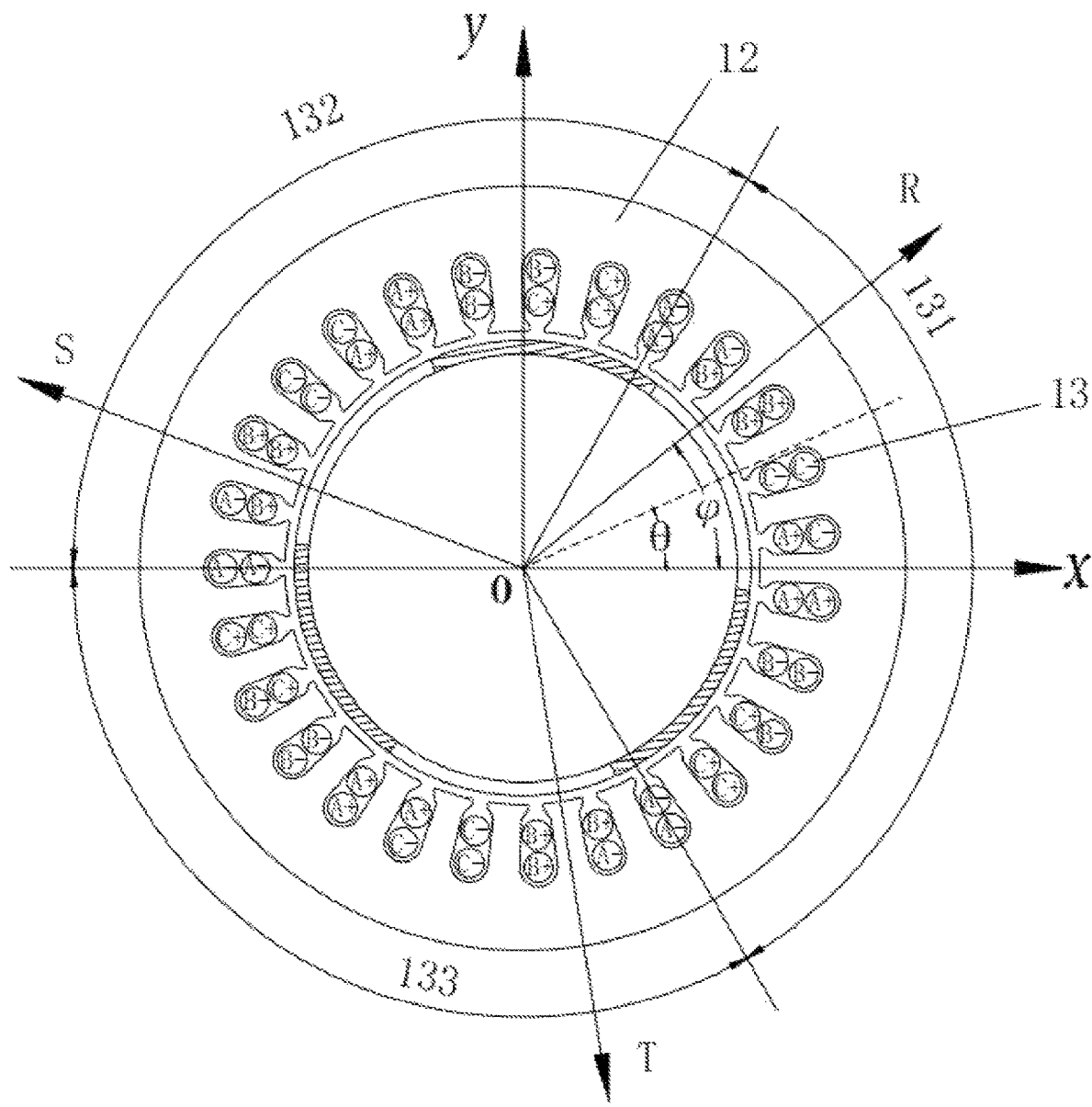
FIG. 3 is a schematic structural diagram of a motor stator according to an embodiment of the present disclosure.

As shown in FIG. 3, this embodiment uses a three-phase motor with 27 stator slots and three pole pairs in the armature windings 13 as an example to explain the technical solution of the present disclosure. The stator slots and the armature windings 13 are averagely divided into three winding units. By changing damping components of currents in the three winding units, the magnetic field distribution is altered. A damping component of the armature current is represented by $i_d$, while a rotating component is represented by $i_q$. FIG. 3 also illustrates coordinate systems of the motor, where XY is a stationary two-phase coordinate system, and RST is a rotating three-phase coordinate system. The positive directions of the three coordinate axes are aligned with radial electromagnetic forces produced by the three winding units. An angle between the R-axis and the X-axis is a spatial phase angle $\varphi$ of a radial force $F_1$ generated by a winding unit I.

Figure 4:
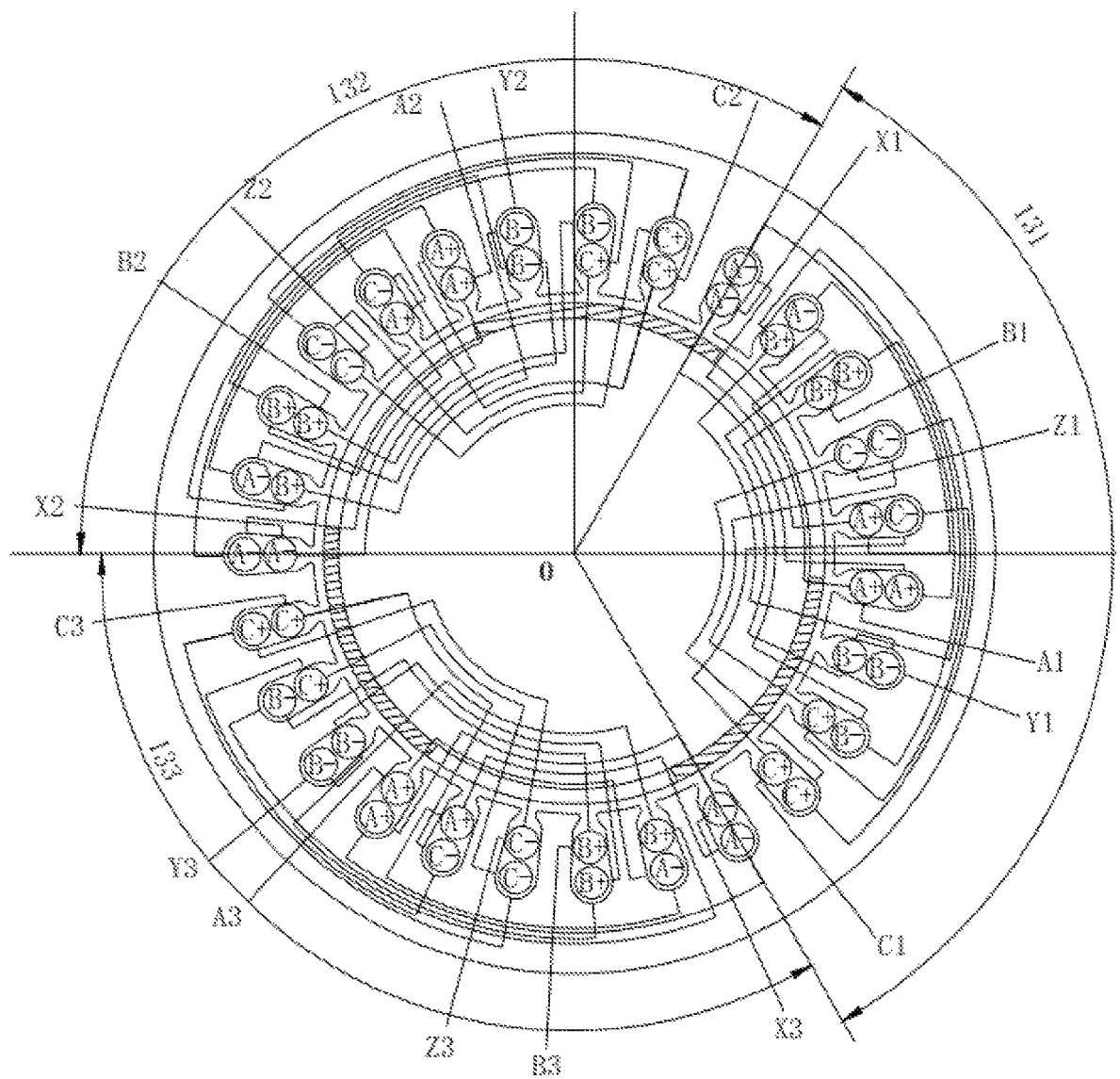
FIG. 4 is a schematic structural diagram of armature windings according to an embodiment of the present disclosure.
Figure 5:
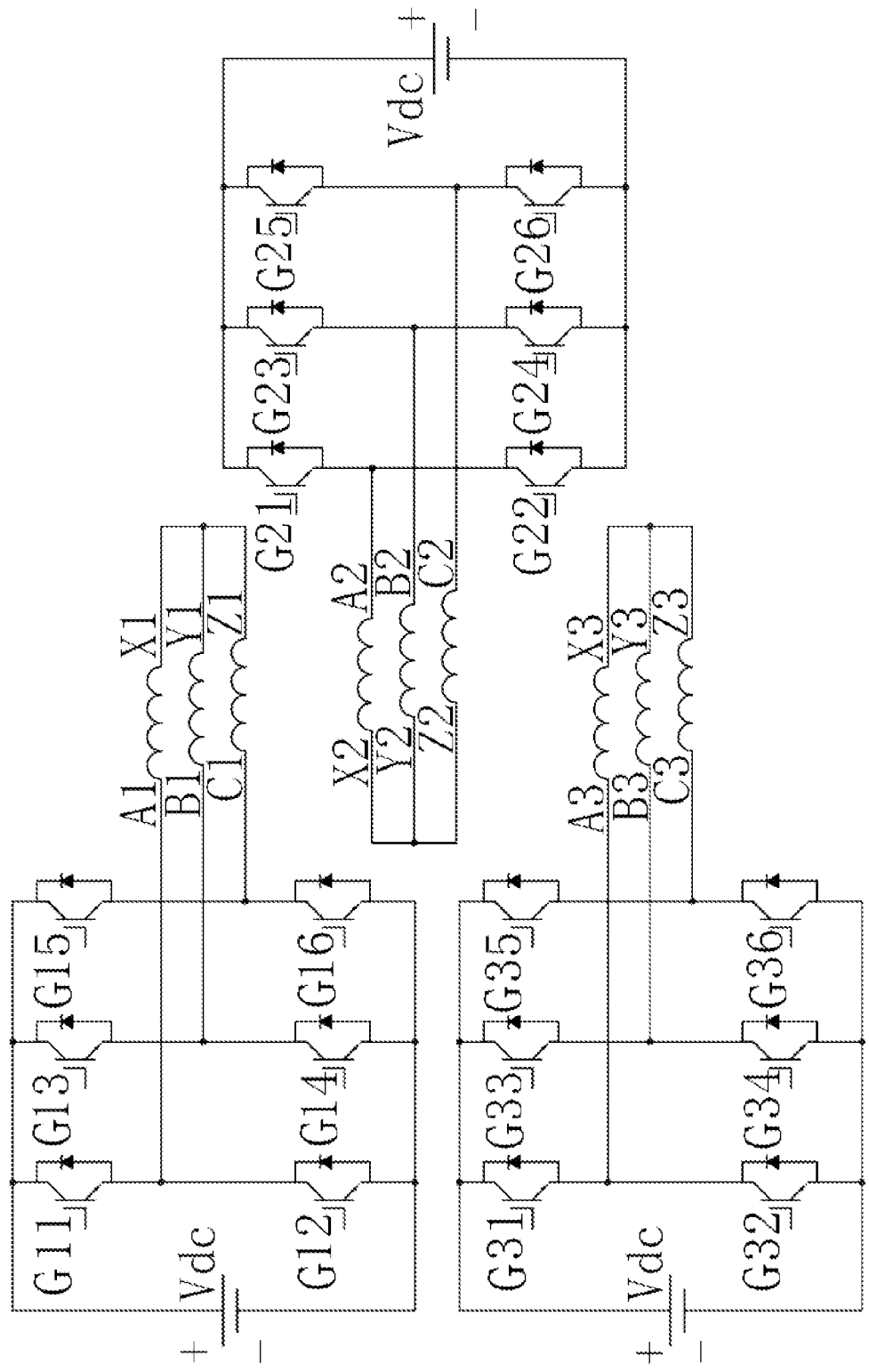
FIG. 5 is a schematic diagram of an armature winding drive circuit according to an embodiment of the present disclosure.

As shown in FIG. 4 and FIG. 5, the winding connection of the motor in this embodiment is as follows: A1, X1, B1, Y1, C1, Z1 are lead-out wires for the first winding unit; A2, X2, B2, Y2, C2, Z2 are lead-out wires for the second winding unit; A3, X3, B3, Y3, C3, Z3 are lead-out wires for the third winding unit, where the lead-out wires of the three winding units are connected to respective drive circuits 41. The armature windings 13 in this embodiment are divided into three winding units, each of which is driven by its own three-phase bridge inverter circuit. The application of the present disclosure on conventional motors does not require structural modification. However, each winding unit operates independently, and although it increases the number of inverters (one for each winding unit), the total capacity of the inverters in the system remains almost the same, thereby controlling costs. Compared to magnetic-gas hybrid bearings, the electromagnetic damping solution of the present disclosure does not occupy additional radial or axial space, resulting in a smaller system volume and higher power density.

Figure 6:
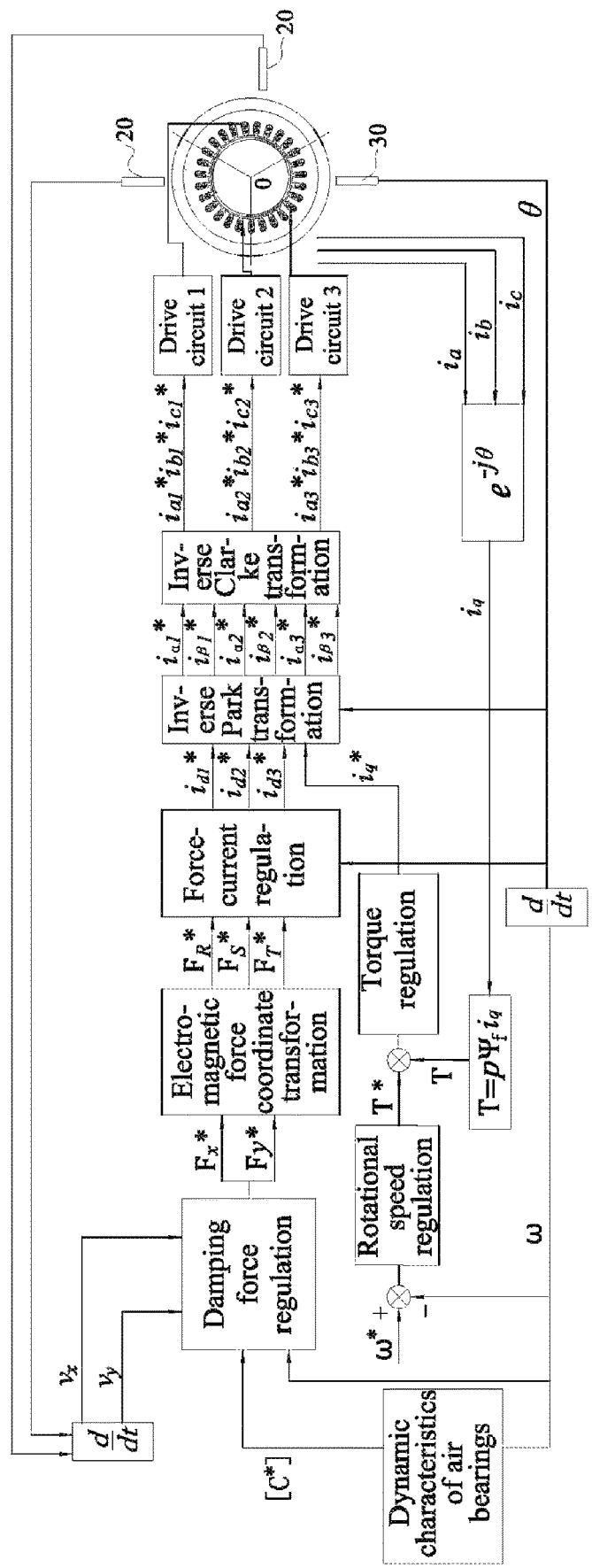
FIG. 6 is a block diagram of a control model according to an embodiment of the present disclosure.

As shown in FIG. 6, the present disclosure provides a control method of a high-speed motor with support of air bearings 11, for controlling the foregoing high-speed motor rotor system with support of air bearings 11. The method includes the following steps:

S1: Detect and calculate real-time motion velocities $v_x$ and $v_y$ of a rotating shaft 10 of a motor in x-axis and y-axis directions by using radial displacement sensors 20. A method for calculating and measuring the real-time motion velocities $v_x$ and $v_y$ of the rotating shaft 10 of the motor in the x-axis and y-axis directions includes: measuring two sets of motion velocities $v_{x1}$, $v_{y1}$, and $v_{x2}$, $v_{y2}$ in the x-axis and y-axis directions at both sides of the rotating shaft 10 of the motor by using two groups of displacement sensors that are located at both sides of the motor rotor 14, and calculating average values of the two sets of motion velocities as the motion velocities $v_x$ and $v_y$ of the rotating shaft 10 of the motor in the x-axis and y-axis directions:

$$v_x = \frac{v_{x1} + v_{x2}}{2}, v_y = \frac{v_{y1} + v_{y2}}{2}.$$

S2: Detect a position angle of the motor rotor 14 by using a position sensor 30 for the motor rotor 14, and calculate a real-time rotational speed $\omega$ of the rotating shaft 10 of the motor.

S3: Calculate electromagnetic damping forces $F_x^*$ and $F_y^*$ required to maintain system stability under current operating conditions according to the real-time motion velocities $v_x$ and $v_y$, and the real-time rotational speed $\omega$ of the rotating shaft 10 of the motor.

S4: Calculate required electromagnetic damping force component amplitudes $F_1^*, F_2^*, \ldots, F_p^*$ for each winding unit according to the electromagnetic damping forces $F_x^*$ and $F_y^*$ required to maintain system stability under the current operating conditions, which includes: determining a spatial phase angle $\varphi$ corresponding to each winding unit according to a position angle $\theta$ of the motor rotor 14 in a current state, and calculating the required electromagnetic damping force component amplitudes $F_1^*, F_2^*, \ldots, F_p^*$ for each winding unit according to the spatial phase angle $\varphi$ of each winding unit and the electromagnetic damping forces $F_x^*$ and $F_y^*$.

S5: Calculate damping current components $i_{d1}^*, i_{d2}^*, \ldots, i_{dn}^*, \ldots, i_{dp}^*$ needed for each winding unit according to the required electromagnetic damping force component amplitudes $F_1^*, F_2^*, \ldots, F_p^*$ for each winding unit. The damping current components are calculated as follows:

$$i_{dn}^* = F_n^*/K(\theta)$$

where $K(\theta)$ is a force-to-current coefficient determined experimentally.

S6: Perform an inverse Park transformation on the damping current components $i_{d1}^*, i_{d2}^*, \ldots, i_{dn}^*, \ldots, i_{dp}^*$ of each winding unit to obtain currents $i_{\alpha 1}^*/i_{\beta 2}^*, i_{\alpha 2}^*/i_{\beta 2}^* \ldots, i_{\alpha p}^*/i_{\beta p}^*$ of each winding unit in a stationary two-phase coordinate system.

S7: Convert the currents $i_{\alpha 1}^*/i_{\beta 1}^*, i_{\alpha 2}^*/i_{\beta 2}^* \ldots, i_{\alpha p}^*/i_{\beta p}^*$ of each winding unit in the stationary two-phase coordinate system to three-phase coordinate system currents $i_{a1}^*/i_{b1}^*/i_{c1}^*, i_{a2}^*/i_{b2}^*/i_{c2}^* \ldots, i_{ap}^*/i_{bp}^*/i_{cp}^*$ through an inverse Clarke transformation, and controller units output the three-phase coordinate system currents $i_{a1}^*/i_{b1}^*/i_{c1}^*, i_{a2}^*/i_{b2}^*/i_{c2}^* \ldots, i_{ap}^*/i_{bp}^*/i_{cp}^*$ to respective drive circuits 41 of the winding units.

A method for calculating the electromagnetic damping forces $F_x^*$ and $F_y^*$ required to maintain system stability under the current operating conditions in step S3 includes the following steps:

S31: Experimentally measure dynamic damping coefficients $[C_{xx}, C_{xy}, C_{yx}, C_{yy}]$ and dynamic stiffness coefficients $[K_{xx}, K_{xy}, K_{yx}, K_{yy}]$ of the air bearings 11 corresponding to any rotational speed.

S32: Based on stability conditions of the air bearings 11, for a rotor system with mass $m_r$:

$$\begin{vmatrix} m_r\gamma^2 + C_{xx}\gamma + K_{xx} & C_{xy}\gamma + K_{xy} \\ C_{yx}\gamma + K_{yx} & m_r\gamma^2 + C_{yy}\gamma + K_{yy} \end{vmatrix} = 0$$

by expanding the above equation, obtaining a characteristic equation about a vibration frequency $\gamma$, with real parts of roots less than 0, which indicates that required dynamic damping coefficients for vibration suppression are $[C_{xx}^s, C_{xy}^s, C_{yx}^s, C_{yy}^s]$ in the case of constant dynamic stiffness coefficients; and accordingly, calculating the damping coefficients required to maintain system stability as follows:

$$[C_{xx}^*, C_{xy}^*, C_{yx}^*, C_{yy}^*] = [C_{xx}^s - C_{xx}, C_{xy}^s - C_{xy}, C_{yx}^s - C_{yx}, C_{yy}^s - C_{yy}].$$

S33: Calculate the electromagnetic damping forces $F_x^*$ and $F_y^*$ required to maintain system stability under the current operating conditions as follows:

$$F_x^* = C_{xx}^* \cdot v_x + C_{xy}^* \cdot v_y$$

$$F_y^* = C_{yx}^* \cdot v_x + C_{yy}^* \cdot v_y.$$

Before implementing the control method above, it is necessary to perform test and calculation in advance to obtain dynamic characteristic parameters of the system of the radial air bearings 11: A dynamic damping coefficients [C] and dynamic stiffness coefficients [K] of the air bearing 11 at different speeds are determined through tests. Required dynamic damping coefficients $[C^s]$ for vibration suppression are calculated based on the stability criteria of the air bearing 11, assuming [K] remains constant. Difference between $[C^s]$ and [C] are calculated, to form a table of damping coefficients $[C^*]$ provided by the electromagnetic damping forces at different measured angular velocities $\omega$. This table will be used by the controller 40 for reference. Similarly, tests need to be performed to determine an amplitude-phase relationship between a d-axis current component of a unit motor at different position angles $\theta$ of the motor rotor 14 and the generated radial force, to form a discrete table of coefficients $K(\theta)$ for transformation between radial electromagnetic forces and d-axis currents, and spatial phase angles $\varphi(\theta)$ of radial damping forces at different position angles $\theta$ of the motor rotor 14.

With reference to the three-phase motor with 27 stator slots and three pole pairs in the armature windings 13 in this embodiment, S4 to S7 are further explained. The specific calculation steps are as follows: an electromagnetic force coordinate transformation needs to be performed on $F_x^*$ and $F_y^*$, to obtain electromagnetic damping forces for each winding unit, denoted as $F_R^*, F_S^*$, and $F_T^*$:

$$\begin{bmatrix} F_R^* \\ F_S^* \\ F_T^* \end{bmatrix} = \frac{3}{2} \begin{bmatrix} \cos\varphi(\theta) & \sin\varphi(\theta) \\ \cos(\varphi(\theta)+120°) & \sin(\varphi(\theta)+120°) \\ \cos(\varphi(\theta)-120°) & \sin(\varphi(\theta)-120°) \end{bmatrix} \begin{bmatrix} F_x^* \\ F_y^* \end{bmatrix}.$$

The d-axis current components $i_{d1}^*, i_{d2}^*$ and $i_{d3}^*$ for each winding unit are as follows:

$$\begin{bmatrix} i_{d1}^* \\ i_{d2}^* \\ i_{d3}^* \end{bmatrix} = \frac{1}{K(\theta)} \begin{bmatrix} F_R^* \\ F_S^* \\ F_T^* \end{bmatrix}.$$

A difference between a given angular velocity $\omega^*$ and a measured angular velocity $\omega$ is calculated, and a desired torque $T^*$ is calculated through speed regulation. The motor controller 40 detects the three-phase currents $i_a, i_b, i_c$ in one winding unit, which are converted into a measured q-axis current $i_q$ through $e^{-j}$ coordinate transformation. A feedback torque value T is calculated based on the measured q-axis current $i_q$ and the permanent magnet flux $\Psi_f$ through the following formula: $T = p\Psi_f i_q$. A difference between the desired torque $T^*$ and the feedback torque value T is calculated, and a desired q-axis current $i_q^*$ is calculated through torque regulation. The $e^{-j}$ coordinate transformation is as follows (where $\theta_e$ is an electrical angle, $\theta_e = p\theta$):

$$\begin{bmatrix} i_d \\ i_q \end{bmatrix} = \frac{2}{3} \begin{bmatrix} \cos\theta_e & \cos(\theta_e - 120°) & \cos(\theta_e + 120°) \\ -\sin\theta_e & -\sin(\theta_e - 120°) & -\sin(\theta_e + 120°) \end{bmatrix} \begin{bmatrix} i_a \\ i_b \\ i_c \end{bmatrix}$$

After the inverse Park transformation and inverse Clarke transformation, the desired currents for three-phase windings in each winding unit are obtained, which are amplified by the three independent drive circuits 41 and sent to the corresponding winding units to generate electromagnetic damping forces.

A formula of the inverse Park transformation for the three winding units is as follows:

$$\begin{bmatrix} i_{\alpha 1}^* \\ i_{\beta 1}^* \end{bmatrix} = \begin{bmatrix} \cos\theta_e & -\sin\theta_e \\ \sin\theta_e & \cos\theta_e \end{bmatrix} \begin{bmatrix} i_{d1}^* \\ i_q^* \end{bmatrix}$$

$$\begin{bmatrix} i_{\alpha 2}^* \\ i_{\beta 2}^* \end{bmatrix} = \begin{bmatrix} \cos\theta_e & -\sin\theta_e \\ \sin\theta_e & \cos\theta_e \end{bmatrix} \begin{bmatrix} i_{d2}^* \\ i_q^* \end{bmatrix}$$

$$\begin{bmatrix} i_{\alpha 3}^* \\ i_{\beta 3}^* \end{bmatrix} = \begin{bmatrix} \cos\theta_e & -\sin\theta_e \\ \sin\theta_e & \cos\theta_e \end{bmatrix} \begin{bmatrix} i_{d3}^* \\ i_q^* \end{bmatrix}.$$

A formula of the inverse Clarke transformation for the three winding units is as follows:

$$\begin{bmatrix} i_{a1}^* \\ i_{b1}^* \\ i_{c1}^* \end{bmatrix} = \frac{3}{2} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} i_{\alpha 1}^* \\ i_{\beta 1}^* \end{bmatrix}$$

$$\begin{bmatrix} i_{a2}^* \\ i_{b2}^* \\ i_{c2}^* \end{bmatrix} = \frac{3}{2} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} i_{\alpha 2}^* \\ i_{\beta 2}^* \end{bmatrix}$$

$$\begin{bmatrix} i_{a3}^* \\ i_{b3}^* \\ i_{c3}^* \end{bmatrix} = \frac{3}{2} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} i_{\alpha 2}^* \\ i_{\beta 2}^* \end{bmatrix}$$

With these steps, the three-phase currents for the three winding units are fully determined.

The control for the electromagnetic damping forces of each winding unit is independent of each other, and the rotational current components and damping current components are also mutually independent. Therefore, from an overall perspective, the system control is decoupled, with minimal mutual interference. The electromagnetic damping forces, based on the inherent dynamic characteristics of the air bearing 11, provide the necessary damping for system stability, enhancing stability and reliability of the system. This results in a corresponding increase in the theoretical maximum speed of the air bearing 11.

In summary, beneficial effects of the embodiments of the present disclosure are as follows: By providing additional damping forces to the rotating shaft 10 based on the inherent dynamic characteristics of the air bearings 11, the present disclosure improves the high-speed stability of the air bearings 11, enhances the overall system reliability, and increases the maximum rotational speed of the system. Unlike bearingless motors that need to provide electromagnetic support forces for the entire rotating shaft 10 throughout its operation, the present disclosure relies on support of the air bearings 11, and the motor only needs to provide relatively small radial damping forces in addition to the torque, resulting in lower damping components of the current, making the motor applicable in high-power scenarios. Compared to magnetic-gas hybrid bearing systems, the technical solution of the present disclosure eliminates the magnetic bearing structure, saving space in the radial or axial direction, thereby achieving a smaller volume and higher power density. The present disclosure reuses the armature windings 13 of the motor. The effective structure of the motor is used efficiently, and the hardware structure is simple. The present disclosure can be implemented by retrofitting a standard motor without modifying the stator structure, and there is no need to increase the capacity of the inverter, which keeps the cost low and achieves high universality. The provided electromagnetic damping forces are controllable in a segmented manner, allowing for independent control for the winding units. The control is decoupled, which minimizes mutual interference.

The technical solutions of the present disclosure are described with reference to the accompanying drawings. It should be noted that these descriptions are merely intended to explain the technical solutions of the present disclosure, and may not be construed as limiting the protection scope of the present disclosure in any way. Therefore, those skilled in the art may derive other specific implementations of the present disclosure without creative effort, but these implementations should fall within the protection scope of the present disclosure.

What is claimed is:

1. A high-speed motor system with air bearing support, comprising:
    a rotating shaft, air bearings, a motor stator, a motor rotor, and radial displacement sensors,
    wherein the radial displacement sensors are arranged in two groups, located outside the rotating shaft at both sides of the motor rotor; the radial displacement sensors are used to detect displacement of the rotating shaft in x-axis and y-axis directions; and
    the motor stator is provided with stator slots having armature windings inside; the armature windings are electrically connected to a controller; the armature windings are averagely divided into p winding units according to a number of pole pairs p thereof; the controller comprises p control units that control the winding units respectively; each control unit inputs a damping current component to the corresponding winding unit, for generating an electromagnetic damping force.

2. The high-speed motor system with air bearing support according to claim 1, wherein each group of the radial displacement sensors comprise two displacement sensors arranged at a 90° angle to each other, for measuring the displacement of the rotating shaft in the x-axis and y-axis directions.

3. The high-speed motor system with air bearing support according to claim 1, wherein a motor rotor position sensor is further provided outside the rotating shaft, to measure a position angle of the motor rotor.

4. A control method of a high-speed motor with air bearing support, for controlling the high-speed motor system with air bearing support according to claim 3, wherein the method comprises the following steps:
    S1: detecting and calculating real-time motion velocities $v_x$ and $v_y$ of a rotating shaft of a motor in x-axis and y-axis directions by using the radial displacement sensors;
    S2: detecting a position angle of the motor rotor by using a motor rotor position sensor and calculating a real-time rotational speed ω of the rotating shaft of the motor;
    S3: calculating electromagnetic damping forces $F_x^*$ and $F_y^*$ required to maintain system stability under current operating conditions according to the real-time motion velocities $v_x$ and $v_y$, and the real-time rotational speed $\omega$ of the rotating shaft of the motor;

S4: calculating required electromagnetic damping force component amplitudes $F_1^*, F_2^*, \ldots, F_p^*$ for each winding unit according to the electromagnetic damping forces $F_x^*$ and $F_y^*$ required to maintain system stability under current operating conditions; and S5: calculating damping current components $i_{d1}^*, i_{d2}^*, \ldots, i_{dn}^*, \ldots, i_p^*$ needed for each winding unit according to the required electromagnetic damping force component amplitudes $F_1^*, F_2^*, \ldots, F_p^*$ for each winding unit.

5. The control method of a high-speed motor with air bearing support according to claim 4, wherein a method for calculating and measuring the real-time motion velocities $v_x$ and $v_y$ of the rotating shaft of the motor in the x-axis and y-axis directions in step S1 comprises: measuring two sets of motion velocities $v_{x1}, v_{y1},$ and $v_{x2}, v_{y2}$ in the x-axis and y-axis directions at both sides of the rotating shaft of the motor by using the two groups of displacement sensors that are located at both sides of the motor rotor, and calculating average values of the two sets of motion velocities as the motion velocities $v_x$ and $v_y$ of the rotating shaft of the motor in the x-axis and y-axis directions:

$$v_x = \frac{v_{x1} + v_{x2}}{2}, v_y = \frac{v_{y1} + v_{y2}}{2}.$$

6. The control method of a high-speed motor with air bearing support according to claim 4, wherein a method for calculating the electromagnetic damping forces $F_x^*$ and $F_y^*$ required to maintain system stability under the current operating conditions in step S3 comprises the following steps:

S31: experimentally measuring dynamic damping coefficients $[C_{xx}, C_{xy}, C_{yx}, C_{yy}]$ and dynamic stiffness coefficients $[K_{xx}, K_{xy}, K_{yx}, K_{yy}]$ of air bearings corresponding to any rotational speed;

S32: based on stability conditions of the air bearings, for a rotor system with mass $m_r$:

$$\begin{vmatrix} m_r\gamma^2 + C_{xx}\gamma + K_{xx} & C_{xy}\gamma + K_{xy} \\ C_{yx}\gamma + K_{yx} & m_r\gamma^2 + C_{yy}\gamma + K_{yy} \end{vmatrix} = 0$$

by expanding the above equation, obtaining a characteristic equation about a vibration frequency $\gamma$, with real parts of roots less than 0, which indicates that required dynamic damping coefficients for vibration suppression are $[C_{xx}^s, C_{xy}^s, C_{yx}^s, C_{yy}^s]$ in a case of constant dynamic stiffness coefficients; and accordingly, calculating the damping coefficients required to maintain system stability as follows:

$$[C_{xx}^*, C_{xy}^*, C_{yx}^*, C_{yy}^*] = [C_{xx}^s - C_{xx}, C_{xy}^s - C_{xy}, C_{yx}^s - C_{yx}, C_{yy}^s - C_{yy}];$$

and

S33: calculating the electromagnetic damping forces $F_x^*$ and $F_y^*$ required to maintain system stability under the current operating conditions as follows:

$$F_x^* = C_{xx}^* \cdot v_x + C_{xy}^* \cdot v_y$$

$$F_y^* = C_{yx}^* \cdot v_x + C_{yy}^* \cdot v_y.$$

7. The control method of a high-speed motor with air bearing support according to claim 4, wherein a method for calculating the required electromagnetic damping force component amplitudes $F_1^*, F_2^*, \ldots, F_p^*$ for each winding unit in step S4 comprises: determining a spatial phase angle $\omega$ corresponding to each winding unit according to a position angle $\theta$ of the motor rotor in a current state, and calculating the required electromagnetic damping force component amplitudes $F_1^*, F_2^*, \ldots, F_p^*$ for each winding unit according to the spatial phase angle $\varphi$ of each winding unit and the electromagnetic damping forces $F_x^*$ and $F_y^*$.

8. The control method of a high-speed motor with air bearing support according to claim 4, wherein a method for calculating the damping current components needed for each winding unit in step S5 is as follows:

$$i_{dn}^* = F_n^*/K(\theta)$$

wherein $K(\theta)$ is a force-to-current coefficient determined experimentally.

9. The control method of a high-speed motor with air bearing support according to claim 4, further comprising:

S6: performing an inverse Park transformation on the damping current components $i_{d1}^*, i_{d2}^*, \ldots, i_{dn}^*, \ldots, i_{dp}^*$ of each winding unit to obtain currents $i_{\alpha 1}^*/i_{\beta 1}^*, i_{\alpha 2}^*/i_{\beta 2}^* \ldots, i_{\alpha p}^*/i_{\beta p}^*$ of each winding unit in a stationary two-phase coordinate system.

10. The control method of a high-speed motor with air bearing support according to claim 9, further comprising:

S7: converting the currents $i_{\alpha 1}^*/i_{\beta 1}^*, i_{\alpha 2}^*/i_{\beta 2}^* \ldots, i_{\alpha p}^*/i_{\beta p}^*$ of each winding unit in the stationary two-phase coordinate system to three-phase coordinate system currents $i_{a1}^*/i_{b1}^*/i_{c1}^*, i_{a2}^*/i_{b2}^*/i_{c2}^* \ldots, i_{ap}^*/i_{bp}^*/i_{cp}^*$ through an inverse Clarke transformation, and outputting, by controller units, the three-phase coordinate system currents $i_{a1}^*/i_{b1}^*/i_{c1}^*, i_{a2}^*/i_{b2}^*/i_{c2}^* \ldots, i_{ap}^*/i_{bp}^*/i_{cp}^*$ to respective drive circuits of the winding units.

* * * * *